(No Model.)

A. H. WORREST
FERTILIZER FEEDER FOR GRAIN DRILLS.

No. 258,190. Patented May 16, 1882.

Witnesses
Thos. Cochran
Joseph Simson

Inventor
Alfred H. Worrest
by Wm. R. Gerhart
His Attorney

UNITED STATES PATENT OFFICE.

ALFRED H. WORREST, OF SALISBURY TOWNSHIP, LANCASTER COUNTY, PA.

FERTILIZER-FEEDER FOR GRAIN-DRILLS.

SPECIFICATION forming part of Letters Patent No. 258,190, dated May 16, 1882.

Application filed November 19, 1881. (No model.)

*To all whom it may concern:*

Be it known that I, ALFRED H. WORREST, a citizen of the United States, residing in Salisbury township, in the county of Lancaster and State of Pennsylvania, have invented certain Improvements in Fertilizer-Feeders for Grain-Drills, of which the following is a specification.

My invention relates to machines in which the fertilizer is fed into the ground with the grain; and the object of my improvement is to free the fertilizing material from the mechanism feeding it into the grain-tubes. I attain this object by the mechanism illustrated in the accompanying drawings, in which—

Figure 1:
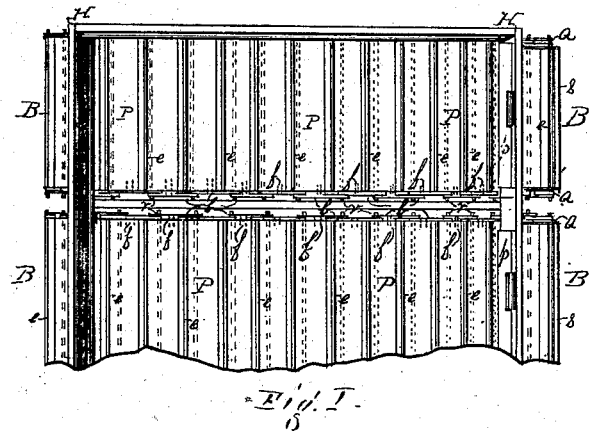
Figure 2:
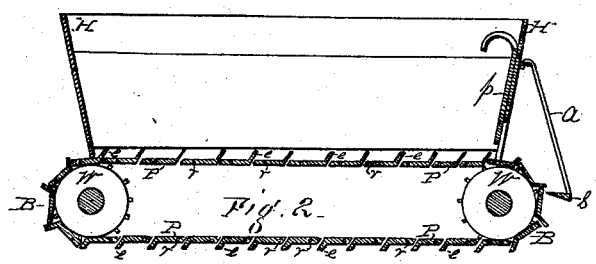
Figure 3:
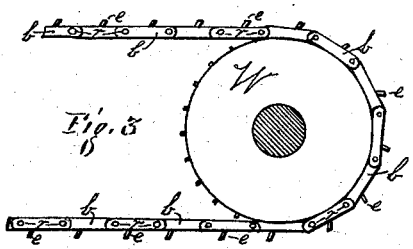

Figure 1 is a top view of my invention; Fig. 2, a vertical section; and Fig. 3, a side view, showing the manner of connecting the plates.

The hopper H, containing the fertilizing material, is of the shape generally in use, and can be placed either in front of or behind that holding the grain. The bottom of this hopper consists of a series of endless belts, B, with links formed of rigid plates P, which have one edge, e, projecting outward, which aid in carrying the fertilizer with the belt. The belts are placed side by side, one being over and feeding each drill-tube. The plates constituting the endless belt are connected, the one with the other, by means of side bars, b, on the side of either end, firmly fastened thereto, as at f, and pivoted to the plate in front of it by rods r, extending across the belt on the inside of the plates. The belt is revolved by means of pulleys or chain-wheels W, having teats projecting therefrom and fitting corresponding countersinks in the inner sides of the plates P, which pulleys are attached to a shaft worked by an attachment to the axle of the machine, with an arrangement by which the rapidity of the movement of the belt with reference to that of the machine may be regulated, increasing or diminishing the amount of fertilizing material fed into the drill-tubes. In linking the plates together the plain edge of each is next the flanged edge of that following it, and they are hinged on the rods r in such manner that when passing around the pulley the plain edge scrapes the side of the flange next to it.

There are two arms, a, with their upper ends hinged to the outer side of the hopper, projecting downward and holding a blade or scraper, s, across the belt in a line in the horizontal plane passing through the axis of the pulleys W, which serves to free the fertilizing material from the surface of the plates. These arms and the scraper can be detached from the hopper at will.

The difficulty in sowing fertilizers is to prevent it from sticking to the machinery. The scraping of the side of the flange adjoining it by the back edge of the plate effectively detaches its load from the flange, and with the jarring thereby occasioned and the revolution of the plates about the pulley detaches the load from the belt; but in case this is insufficient to rid the belt of its load, by reason of the dampness of the fertilizer, the scraper before mentioned is brought into use.

There is a sliding plate, p, secured at the side of the hopper toward which the plates revolve, over each belt, the raising or lowering of which assists in regulating the amount carried out of the hopper.

What I claim as my invention, and desire to secure by Letters Patent, is—

In a fertilizer-feeder, the endless belt B, composed of the plates P, each having one flanged edge, e, linked together, all constructed, arranged, and operating substantially as shown and described, for the purpose specified.

A. H. WORREST.

Witnesses:
SAML. J. HENDERSON,
HENRY W. WORREST.